United States Patent [19]

Jakobsen

[11] 4,347,976

[45] Sep. 7, 1982

[54] REGULATING CIRCUIT FOR THE VALVE OF A REFRIGERATION PLANT

[75] Inventor: Jakob S. Jakobsen, Sonderborg, Denmark

[73] Assignee: Danfoss A/S, Nordborg, Denmark

[21] Appl. No.: 148,152

[22] Filed: Apr. 17, 1980

Related U.S. Application Data

[63] Continuation of Ser. No. 956,649, Nov. 1, 1978, abandoned.

[30] Foreign Application Priority Data

Nov. 3, 1977 [DE] Fed. Rep. of Germany ....... 2749240

[51] Int. Cl.³ ...................... G05D 15/00; F16K 31/00
[52] U.S. Cl. .................................... 236/68 B; 251/11; 62/204
[58] Field of Search ................ 236/68 C, 68 R, 68 A; 251/11; 62/204

[56] References Cited

U.S. PATENT DOCUMENTS

| | | | |
|---|---|---|---|
| 3,168,805 | 2/1965 | Fleary | 251/11 |
| 3,324,674 | 6/1967 | Finnegan et al. | 62/204 |
| 3,465,962 | 9/1969 | Matulich et al. | 236/13 |
| 3,500,634 | 3/1970 | Waseleski, Jr. et al. | 251/11 |
| 3,577,743 | 5/1971 | Long | 62/204 |
| 3,860,169 | 1/1975 | Norman | 236/68 C |
| 4,067,203 | 1/1978 | Behr | 62/208 |
| 4,096,993 | 6/1978 | Behr | 236/68 B |

Primary Examiner—William E. Wayner
Assistant Examiner—Harry Tanner
Attorney, Agent, or Firm—Wayne B. Easton

[57] ABSTRACT

The invention relates to a valve assembly for a refrigeration plant of the kind used for controlling the flow of refrigerant from the evaporator to the compressor. The closure member for the valve unit is controlled directly or indirectly by a reference pressure generator having an expansible chamber filled with a refrigerant medium having vapor and liquid phases. The pressure exerted by the vapor phase of the medium provides a bias for controlling the valve and is directly related to the temperature of the liquid phase. A heat transfer element such as a heating resistor in the liquid phase is heated or allowed to cool in a controlled manner by an external control unit. A temperature responsive sensor element in the liquid phase of the medium is part of a feedback system for the control unit which allows a selected temperature to be maintained in the chamber which results in a desired constant pressure in a valve opening direction to be maintained in a chamber. A control circuit has an evaporator parameter input branch and a second input branch for the feedback temperature sensing element. The control unit has an output for heating the heating resistor in the expansible chamber and a summating section for varying the relative effects of the input branches on the output.

2 Claims, 3 Drawing Figures

REGULATING CIRCUIT FOR THE VALVE OF A REFRIGERATION PLANT

This application is a continuation of Ser. No. 956,649, filed on Nov. 1, 1978 now abandoned.

The invention relates to a regulating circuit for the valve of a refrigeration plant that is controlled by a temperature detected by an external temperature sensor.

Valves of a refrigeration plant are regulated in a very simple manner. In the case of a valve acting as a suction regulator, the evaporator pressure acts on an adjustable spring so that a particular evaporator pressure can be maintained by adjusting the spring. In the case of thermal expansion valves, in a sensor which is applied to the evaporator outlet and which is partially filled with a vaporisable liquid a temperature-dependent vapour pressure is produced which acts against the force of an adjustable spring in the valve and possibly against the evaporator pressure. However, only comparatively simple regulating problems can be solved with these arrangements. For example, it is not possible to take into account the delay periods in a refrigeration plant or to carry out the regulation as a function of several parameters or parameters occurring externally of the refrigeration plant. Remote control also encounters difficulties.

The invention is based on the problem to provide a regulating circuit for a valve of the aforementioned kind, with which it is possible to carry out new types of regulation in refrigeration plant and/or obtain better adaptation of the regulation to the refrigeration plant.

This problem is solved according to the invention (a) by a reference pressure generator which influences the setting element of the valve and comprises heating or cooling means and a feedback temperature sensor in a pressure vessel partially filled with a vaporisable liquid, (b) by a first bridge circuit comprising a first sensing element which serves as an external temperature sensor and delivers an electric signal continuously changeable with the temperature and a desired value setting resistor as well as a first amplifier energised by the diagonal voltage thereof, (c) by a second bridge circuit comprising a second sensing element which serves as a feedback temperature sensor and delivers an electric signal continuously changeable with the temperature and an adjusting setting resistor as well as a second amplifier energised by the diagonal voltage thereof, (d) by a summating circuit in which the output signals of both amplifiers are mixed, (e) and by a third amplifier which is energised thereby and has a downstream current regulator in series with the heating or cooling means.

In this regulating circuit, the valve is set with the aid of a reference pressure which is equal to the vapour pressure of the vaporisable liquid and is accurately controlled by a temperature regulation in the reference pressure generator. The heating or cooling means, the feedback temperature sensor, the second bridge circuit, the summation circuit and the third amplifier with current regulator here form a small regulating loop, whilst the valve, at least part of the refrigeration plant, possibly part of the regulating path influenced by the refrigeration plant, the external temperature sensor, the first bridge circuit, the summation circuit and the third amplifier with current regulator form a large regulating loop. With the aid of the small regulating loop, the reference pressure is kept constant at a particular value which can be changed under the influence of the external regulating loop. In the first bridge circuit, the most varied external temperature sensors may be provided, e.g. a sensor in the cooled medium for a suction pressure regulator or a sensor at the superheating path for an expansion valve. Also, several temperature sensors may be provided, for example for an expansion valve a first sensor at the evaporator inlet and a second sensor at the end of the superheating path. Other influencing possibilities can be introduced by way of the summating circuit, for example in that the output signal is admixed to a further bridge circuit. Further, by exerting an influence at numerous places, particularly by using setting resistors, P, I and D elements, the regulating circuit can be adapted in an optimum manner to a particular refrigeration plant, whether this be by way of follow-up periods, nozzle size of the valve or the refrigerant that is used.

The summating circuit may comprise an adjustable input resistor for each bridge amplifier output signal, both connected to one input of the third amplifier. This gives a very simple current sum formation, the respective influence of the first and second amplifier being adjustable to an optimum.

Further, the first amplifier should be provided with setting means for a P or PI behaviour. Whereas a comparatively rapid response is desired in the small regulating loop, the inertia behaviour of the refrigeration plant can be considered to an optimum in the large regulating loop. This best occurs in conjunction with the first amplifier.

In this case it is particularly favourable if part of the output voltage of the first amplifier that is selectable by means of a potentiometer is applied by way of a condenser to the tapping of an adjustable voltage divider energised by the input voltage of the amplifier. In this circuit, a comparatively small integrated condenser will suffice even with comparatively long follow-up periods. The two setting resistors permit accurate adaptation of the P and I behaviour of the regulating circuit to the refrigeration plant.

An NTC resistor is particularly suitable for the first or second sensing element. However, one can also use a thermo-element. Sometimes a Ni or Pt sensor is also suitable for this purpose.

With particular advantage, the second sensing element is formed by the base-emitter path of a power transistor serving as heating means.

The invention will now be described in more detail with reference to an example illustrated in the drawing, wherein.

Figure 1:
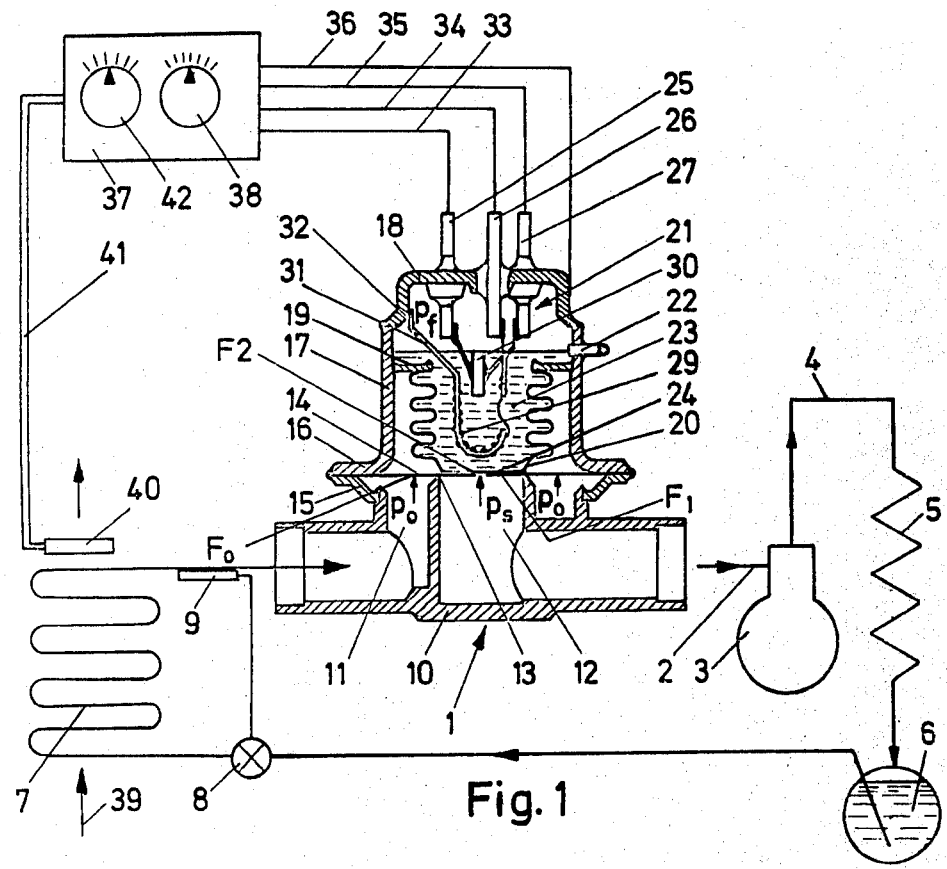
FIG. 1 shows a valve as an evaporator pressure regulator in a refrigeration plant, the valve being actuated by a regulating circuit according to the invention.

FIG. 1 shows a valve 1 which can be disposed in the suction conduit 2 of a refrigeration plant. The refrigeration plant comprises a compressor 3 with a pressure conduit 4, a condenser 5, a collector 6 and an evaporator 7. An expansion valve 8 is controlled by a sensor 9 in response to the suction gas temperature.

The valve 1 comprises a housing 10 with an annular inlet passage 11 and a central outlet passage 12 separated from one another by a valve seat 13. A diaphragm 14 which also serves as a closure member is secured between a flange 15 on the housing 10 and a flange 16 of a capsule 17 which is closed at the top by a dished cover 18. The capsule 17, the cover 18, an annular disc 19 and bellows 20 form a pressure vessel or reference pressure generator 21. By way of a filling tube 22, the latter is filled with a two-phase medium 23 which is present in the liquid phase in the lower portion and in the vapour phase in the upper portion. The base 24 of the bellows 20 has the cross-sectional size of the valve seat 4 and rests on the diaphragm 14. Three pins 25, 26 and 27 pass through the cover 18. Glass insulation 28 simultaneously serves as a seal. A heating resistor 29 in the form of a coil of resistance wire and an NTC temperature sensor 30 are disposed in the liquid phase. These components are held by means of supporting wires 31. The heating resistor 29 is connected to the pin 26 and body 32 of the pressure vessel 21 and the temperature sensor 30 is connected to the pins 25 and 27. By means of four conductors 33, 34, 35 and 36, the said pins and body are connected to a regulating unit 37. With the aid of this, a certain vapour pressure $P_f$ can be produced in the pressure vessel 21 that acts on the second pressure face $F_2$ and can be adjusted with the aid of a rotary knob 38. In the opposite direction, the evaporator pressure $P_o$ acts on the first pressure face $F_o$ and, to a lesser extent, the suction pressure $P_s$ acts on a face $F_1$. This results in a condition of equilibrium.

In the flow path 39 of the medium cooled by the evaporator 7, there is an external temperature sensor 40 which delivers an electric temperature signal to the regulator unit 37 by way of signal lines 41. The unit 37 has a further rotary knob 42 with the aid of which one can set the desired value of the temperature of the cooled medium. In this way the pressure $P_f$ in the pressure vessel 21 can be regulated so that the temperature of the cooled medium retains the set desired value.

The medium 23 is selected so that in the condition of equilibrium it has a higher temperature than the refrigerant and than the ambient temperature. When the evaporator pressure is to be increased, the temperature of the medium 23 is raised by more intensive heating. If, on the other hand, the evaporator pressure is to be reduced, the medium 23 can assume a lower temperature by heat dissipation to the refrigerant and the surrounding air. The vapour pressure will then always remain the same, irrespective of how far the valve has to open to maintain the desired evaporator pressure.

Figure 2:
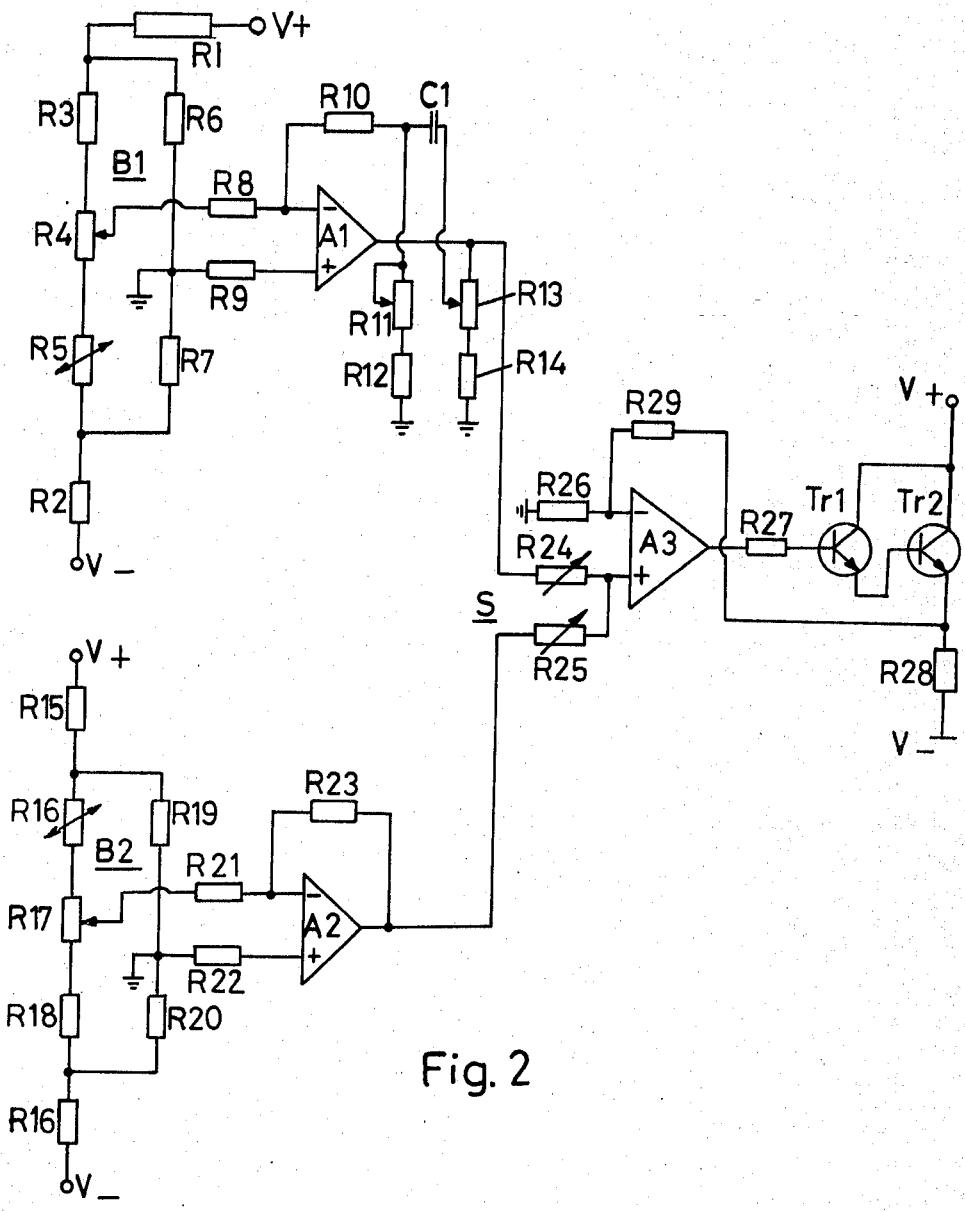
FIG. 2 is the circuit diagram of one embodiment of the regulating circuit.

A regulating circuit that is useful in this connection is shown in FIG. 2. A first bridge B1 is applied between the terminals V+ and V− for the positive and negative voltage by using series resistors R1 and R2. The bridge comprises in its one branch a fixed resistor R3, a potentiometer R4 which is adjustable by the knob 42, and a temperature-dependent resistor R5 which is disposed in the sensor 40. The other branch consists of two fixed resistors R6 and R7 which determine the earthed reference point of the bridge B1.

The two diagonal voltages are applied to the two inputs of a first amplifier A1 by way of a respective resistor R8 and R9. The inverting input is connected to the earthed reference point by way of a resistor R10, a setting resistor R11 and a fixed resistor R12; these resistors therefore form a voltage divider energised by the input voltage. At the tapping between the resistors R10 and R11 there is one electrode of a condenser C1 of which the other electrode is disposed at the tapping of a potentiometer R13. Together with a fixed resistor R14, the potentiometer forms a voltage divider energised by the output voltage.

A second bridge B2 is applied between the voltage sources V+ and V− by using series resistors R15 and R16. In the one branch it comprises a temperature-dependent resistor R16 which corresponds to the sensing resistor 30, a potentiometer R17 with which adjustment is possible, and a fixed resistor R18. The other branch consists of two resistors R19 and R20 between which there is an earthed reference point. The diagonal points are connected by way of the resistors R21 and R22 to the inputs of a second amplifier A2 which is provided with a feedback resistor R23.

A summating circuit S contains two adjustable resistors R24 and R25 by way of which the output signals of the two amplifiers A1 and A2 are fed to a third amplifier A3 of which the other input is applied to the earthed reference point by way of a resistor R26. The output of this amplifier is connected by way of a resistor R27 to a transistor amplifier consisting of two transistors Tr1 and Tr2 in a Darlington connection. A heating resistor R28 corresponding to the transistor 29 is in series with the collector-emitter path of the transistor Tr2. The emitter potential is fed back to the inverting input of the amplifier A3 by way of a resistor R29.

This circuit permits a proportional power amplification of the voltages from the two operational amplifiers A1 and A2 added at the noninverting input of the amplifier A3. With the aid of the variable resistors R24 and R25 it is possible to consider the influences of the two bridges B1 and B2 with different emphasis. With the aid of the resistors R11 and R13 one can set the proportionality factor and the integration constant for the amplifier A1. Altogether, one can in this way achieve a regulation in which the integration condenser C1 does not have to assume very large values.

Figure 3:
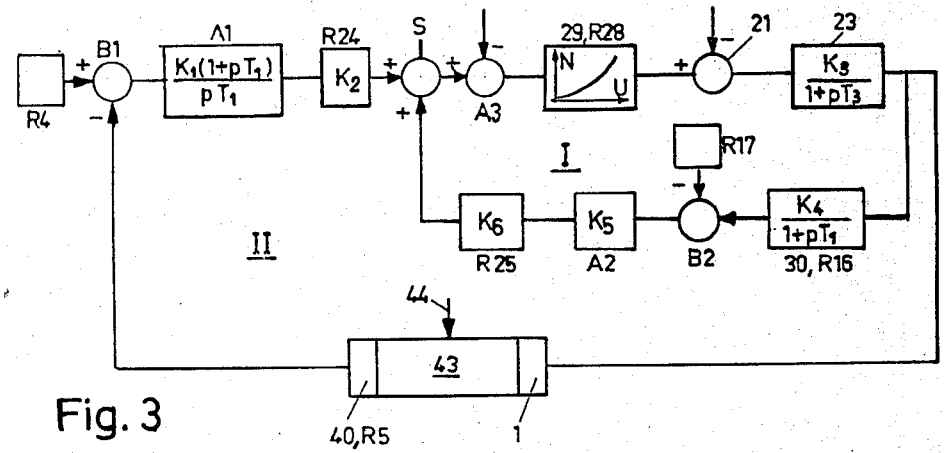
FIG. 3 is a block diagram of the regulating circuit.

The regulating circuit of FIG. 2 produces two regulating loops which co-operate in cascade fashion, namely a small regulating loop I and a large regulating loop II (FIG. 3). The smaller regulating loop comprises the summating circuit S in which the output signals of the two regulating loops are added, the amplifier A3 in which the sum is compared with a fixed voltage, the heating means 29 or heating resistor R28 which has a quadratic transfer function, the reference pressure generator 21 in which the thermal power dissipated to the refrigerant and the surroundings is subtracted from the supplied thermal energy, the two-face medium 23 of which the temperature changes with a certain delay, the feedback temperature sensor 30 or R16 of which the temperature and thus its output signal likewise changes with a certain amount of delay, the second bridge circuit B2 in which the temperature signal is compared with the desired value, the second amplifier A2 and the resistor R25 of the summating circuit which both merely give rise to a proportional change. Between the valve 1 and the external sensor 40 or R3, the larger regulating loop contains the regulating path 43 consisting of the refrigeration plant and the air cooled thereby, an interfering quantity 44, e.g. different inlet temperatures of the air to be cooled, having an influence. The larger regulating loop also comprises the first bridge B1 where the temperature signal of the sensor 40 is compared with the desired value set at the potentiometer R4, the amplifier A1 which has a P and I behaviour, the resistor R24 and then the components S, A3, 29, 21 and 23 which it has in common with the smaller loop.

It will be evident that the smaller regulating loop can by itself be balanced to an optimum, that the long delay periods in the regulating loop II can be taken into consideration by the P and I setting possibilities of the amplifier A1, and that the adaptation of the loops to one another is possible with the aid of the setting resistors of the summating circuit.

Other influencing possibilities are given if further sensing resistors are provided in the bridge B1. For example, in the case of an expansion valve the sensing resistor R5 can be arranged at the end of the superheating path and a second sensing resistor R3 can be arranged at the evaporator inlet. It is also possible to control the integration behaviour as a function of temperature, for example if the resistor R14 is made responsive to temperature. Other resistors can also be made adjustable or act as sensors.

Only slight modifications are necessary if a thermostat is used as the temperature sensor 30 or if the heating resistor 29 is replaced by a power transistor. Again, only slight alterations of the entire circuit are necessary if cooling means are used instead of heating means. Suitable cooling means are for example a Peltier element. The temperature of the liquid 25 must then, however, be under that of the refrigerant or the surrounding air.

What is claimed is:

1. A valve assembly for a refrigeration plant, comprising, a valve, a reference pressure generator for controlling said valve filled with a liquid vapor medium, a heating resistor in said medium, a first feedback external temperature sensor, a second feedback temperature sensor in said medium, a first bridge circuit including said first temperature sensor and a first operational amplifier, a second bridge circuit including said second temperature sensor and a second operational amplifier, a summating circuit for said bridge circuits including a third amplifier connected to said heating resistor, adjustable resistors at the outputs of said bridge circuits connected to the noninverting input of said third amplifier for varying the relative influence of either of said first and second sensors on said third amplifier and thereby on the regulation of said valve, capacitor means and feed back resistor means in series between the output and the inverting input of said amplifier, voltage divider means between said output and said capacitor forming a voltage divider energized by said output for setting a time delay integration constant for said first amplifier, and variable resistance means between the junction of said feedback resistor means and said capacitor means and ground forming a voltage divider energized by the input voltage to the inverting input for setting the proportionality factor for said first amplifier.

2. A valve assembly according to claim 1 wherein said third amplifier is an operation amplifier, said third amplifier having a Darlington amplifier between the output thereof and said heating resistor, and feedback means including a resistor connected between the inverting input of said third amplifier and the junction between said Darlington amplifier and said heating resistor.

* * * * *